United States Patent
Horiuchi

(10) Patent No.: US 11,597,130 B2
(45) Date of Patent: Mar. 7, 2023

(54) CONTROL DEVICE AND CONTROL METHOD FOR INJECTION MOLDING MACHINE

(71) Applicant: FANUC CORPORATION, Minamitsuru-gu (JP)

(72) Inventor: Atsushi Horiuchi, Yamanashi-ken (JP)

(73) Assignee: FANUC CORPORATION, Minamitsuru-Gun (JP)

( * ) Notice: Subject to any disclaimer, the term of this patent is extended or adjusted under 35 U.S.C. 154(b) by 102 days.

(21) Appl. No.: 17/018,107

(22) Filed: Sep. 11, 2020

(65) Prior Publication Data
US 2021/0078231 A1 Mar. 18, 2021

(30) Foreign Application Priority Data
Sep. 18, 2019 (JP) .............................. JP2019-169584

(51) Int. Cl.
*B29C 45/77* (2006.01)
*B29C 45/18* (2006.01)
*B29C 45/50* (2006.01)

(52) U.S. Cl.
CPC .......... *B29C 45/77* (2013.01); *B29C 45/1808* (2013.01); *B29C 45/50* (2013.01); *B29C 2045/1875* (2013.01); *B29C 2045/5096* (2013.01); *B29C 2945/76006* (2013.01); *B29C 2945/76187* (2013.01); *B29C 2945/76498* (2013.01); *B29C 2945/76545* (2013.01); *B29C 2945/76665* (2013.01); *B29C 2945/76933* (2013.01); *B29C 2945/76939* (2013.01)

(58) Field of Classification Search
CPC ................ B29C 45/77; B29C 45/1808; B29C 2945/76006; B29C 2945/76187; B29C 2945/76354; B29C 2945/76568; B29C 2945/76605; B29C 2945/76665; B29C 2945/76846; B29C 2945/76939; B29C 2045/5096; B29C 45/17
USPC ....................................................... 264/40.3
See application file for complete search history.

(56) References Cited

U.S. PATENT DOCUMENTS

| 5,756,037 A | 5/1998 | Kitamura | |
| 6,340,439 B1 * | 1/2002 | Hiraoka | B29C 45/47 |
| | | | 264/40.5 |
| 2008/0150181 A1 * | 6/2008 | Maruyama | B29C 45/766 |
| | | | 264/40.7 |

FOREIGN PATENT DOCUMENTS

JP  H09-29794 A  2/1997

* cited by examiner

*Primary Examiner* — Matthew J Daniels
*Assistant Examiner* — Gregory C. Grosso
(74) *Attorney, Agent, or Firm* — McGinn I.P. Law Group, PLLC.

(57) ABSTRACT

A control device for an injection molding machine is equipped with a pressure acquisition unit that acquires a pressure of a resin, a reverse rotation control unit that causes a screw to be rotated in reverse, after the screw has reached a predetermined metering position, a measurement unit that measures an elapsed time or a rotation amount of the screw from when the screw has reached the predetermined metering position, and a rearward movement control unit that initiates sucking back of the screw in an overlapping manner with the reverse rotation of the screw, in the case that a predetermined rearward movement initiation time has elapsed, or in the case that the screw has been rotated by a predetermined rearward movement initiation rotation amount, from when the screw has reached the predetermined metering position.

11 Claims, 11 Drawing Sheets

FIG. 4

REVERSE ROTATION CONDITION TABLE 86

| No. | REVERSE ROTATION CONDITION | | REARWARD MOVEMENT INITIATION PRESSURE [MPa] |
|---|---|---|---|
| | REVERSE ROTATION SPEED [min⁻¹] | REVERSE ROTATION ANGLE [deg] | |
| 1 | 0～49 | 0～179 | 0.1 |
| 2 | | ≥ 180 | 0.3 |
| 3 | 50～99 | 0～179 | 0.2 |
| 4 | | ≥ 180 | 0.4 |
| 5 | 100～199 | 0～359 | 0.5 |
| 6 | | ≥ 360 | 0.7 |
| 7 | ≥ 200 | ≥ 0 | 1.0 |

CONTROL DEVICE AND CONTROL METHOD FOR INJECTION MOLDING MACHINE

CROSS-REFERENCE TO RELATED APPLICATION

This application is based upon and claims the benefit of priority from Japanese Patent Application No. 2019-169584 filed on Sep. 18, 2019, the contents of which are incorporated herein by reference.

BACKGROUND OF THE INVENTION

Field of the Invention

The present invention relates to a control device and a control method for an injection molding machine.

Description of the Related Art

In relation to an injection molding machine, several methods have been proposed for reducing variations in the product quality of molded products. For example, in Japanese Laid-Open Patent Publication No. 09-029794, in relation to an injection device (injection unit), it has been proposed to perform sucking back of a screw, and reverse rotation of the screw sequentially after metering of a resin. According to the disclosure, and in accordance with such actions, variations in weight of the resin inside the cylinder are reduced.

SUMMARY OF THE INVENTION

In such a method of sequentially performing suck back and reverse rotation of the screw, it is necessary to wait until one of such actions is completed before the other one can be initiated. Therefore, such a method is not preferable from the standpoint of obtaining molded products efficiently on a timewise basis.

Thus, an object of the present invention is to provide a control device and a control method for an injection molding machine, in which it is easy to quickly achieve a reduction in pressure, and to stabilize the required time period needed for such a reduction in pressure.

According to one aspect of the present invention, there is provided a control device for an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the control device including a pressure acquisition unit configured to acquire a pressure of the resin, a reverse rotation control unit configured to cause the screw to be rotated in reverse based on a predetermined reverse rotation condition, so as to reduce the pressure of the resin, after the screw has reached the predetermined metering position, a measurement unit configured to measure an elapsed time or a rotation amount of the screw from when the screw has reached the predetermined metering position, and a rearward movement control unit configured to initiate sucking back of the screw on the basis of a predetermined rearward movement condition so as to occur in an overlapping manner with the reverse rotation of the screw, in the case that a predetermined rearward movement initiation time has elapsed, or in the case that the screw has been rotated by a predetermined rearward movement initiation rotation amount, from when the screw has reached the predetermined metering position.

According to another aspect of the present invention, there is provided a method of controlling an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the method including a reverse rotation control step of causing the screw to be rotated in reverse based on a predetermined reverse rotation condition, so as to reduce a pressure of the resin, while measuring the pressure of the resin inside the cylinder, and an elapsed time or a rotation amount of the screw, from when the screw has reached the predetermined metering position, and a rearward movement control step of carrying out sucking back of the screw on the basis of a predetermined rearward movement condition so as to occur in an overlapping manner with the reverse rotation of the screw, in the case that a predetermined rearward movement initiation time has elapsed, or in the case that the screw has been rotated by a predetermined rearward movement initiation rotation amount, from when the screw has reached the predetermined metering position.

According to the present invention, the control device and the control method for an injection molding machine are provided, in which it is easy to quickly achieve a reduction in pressure, and to stabilize the required time period needed for such a reduction in pressure.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 4 is an example of a table that is referred to by a measurement unit according to the embodiment;

DESCRIPTION OF THE PREFERRED EMBODIMENTS

Preferred embodiments of a control device and a control method for an injection molding machine according to the present invention will be presented and described in detail below with reference to the accompanying drawings. It should be noted that each of the directions discussed below conform to the arrows shown in the respective drawings.

EMBODIMENTS

Figure 1:
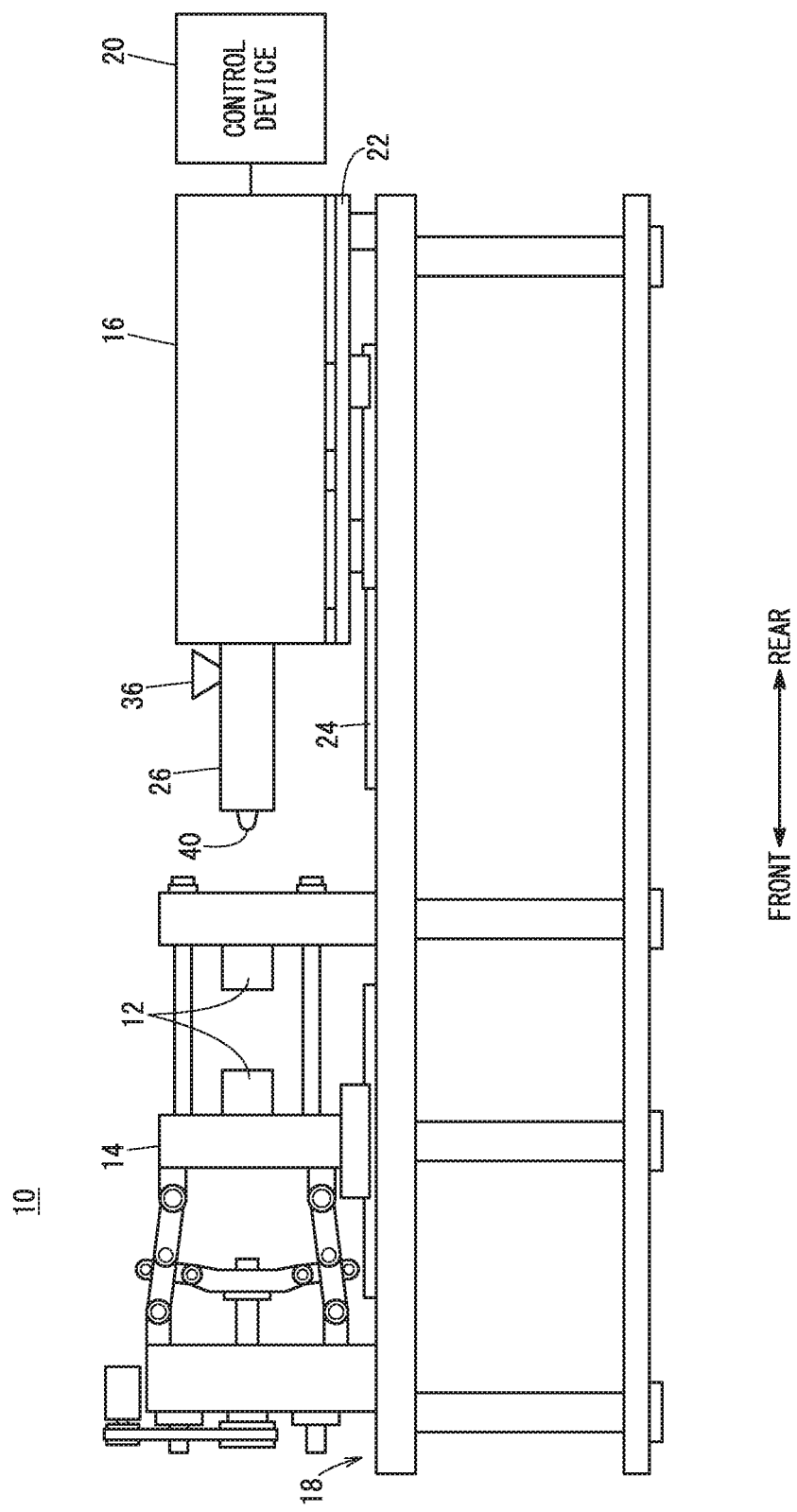
FIG. 1 is a side view of an injection molding machine according to an embodiment of the present invention.

FIG. 1 is a side view of an injection molding machine 10 according to an embodiment of the present invention.

The injection molding machine 10 according to the present embodiment comprises a mold clamping unit 14 having a mold 12 that is capable of being opened and closed, an injection unit 16 that faces toward the mold clamping unit 14 in a front-rear direction, a machine base 18 on which such components are supported, and a control device 20 that controls the injection unit 16.

Among such components, the mold clamping unit 14 and the machine base 18 can be configured based on a known technique. Accordingly, in the following discussion, descriptions of the mold clamping unit 14 and the machine base 18 will be appropriately omitted.

Prior to describing the control device 20 of the present embodiment, at first, a description will be given concerning the injection unit 16, which is a control target of the control device 20.

The injection unit 16 is supported by a base 22, and the base 22 is supported by a guide rail 24 which is installed on the machine base 18 so as to be capable of moving forward and backward. Consequently, the injection unit 16 is capable of moving forward and backward on the machine base 18, and can both come into contact with and separate away from the mold clamping unit 14.

Figure 2:
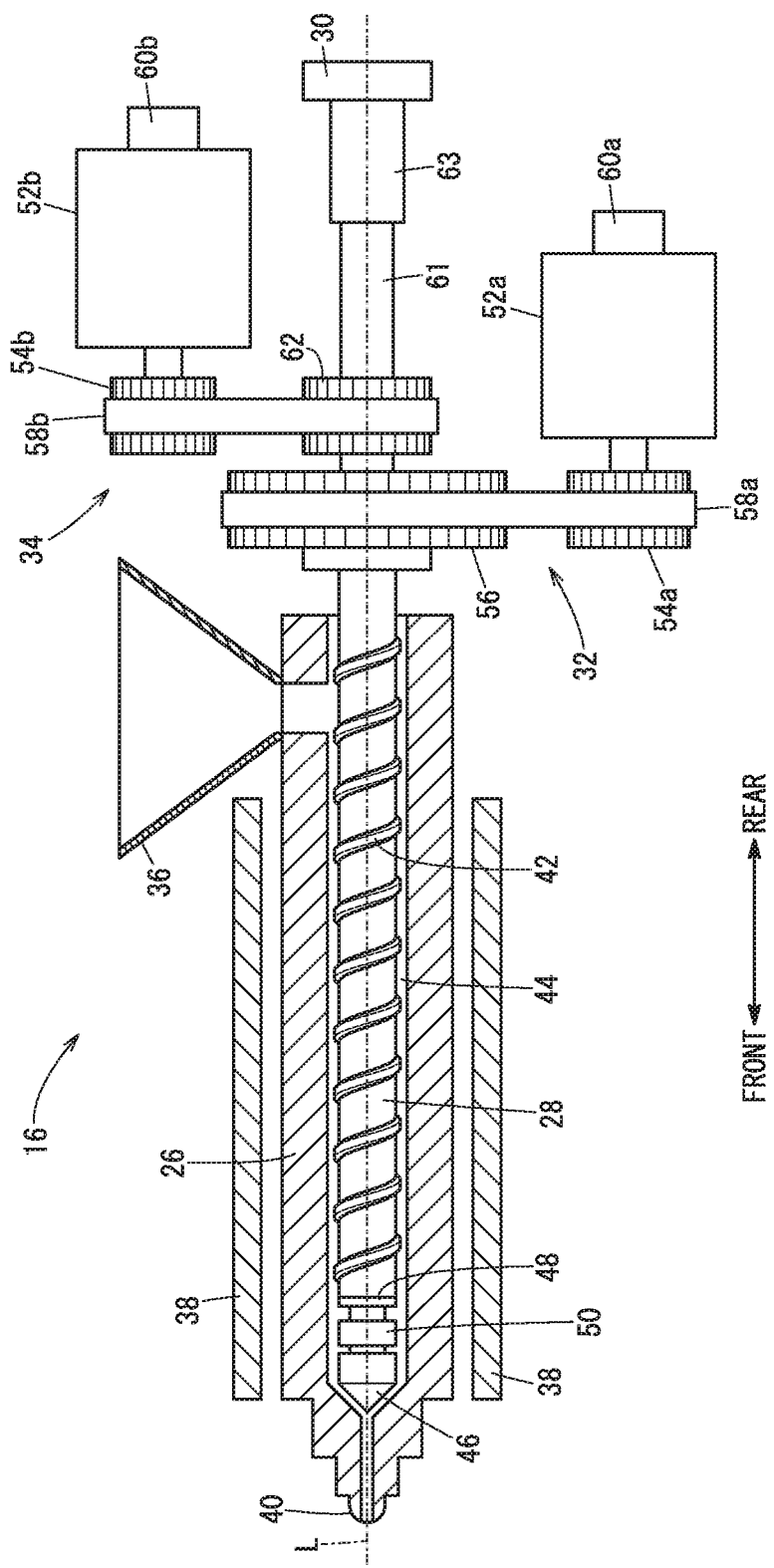
FIG. 2 is a schematic cross-sectional view of an injection unit according to the embodiment.

FIG. 2 is a schematic cross-sectional view of the injection unit 16.

The injection unit 16 is equipped with a tubular shaped heating cylinder (cylinder) 26, a screw 28 provided inside the cylinder 26, a pressure sensor 30 provided on the screw 28, and a first drive device 32 and a second drive device 34 connected to the screw 28.

The axial lines of the cylinder 26 and the screw 28 coincide with each other on an imaginary line L according to the present embodiment. Such a system may also be referred to as an "in-line (in-line screw) system". Further, an injection molding machine to which such an in-line system is applied may also be referred to as an "in-line injection molding machine".

As advantages of such an in-line injection molding machine, there may be cited, for example, a point in which the structure of the injection unit 16 is simpler, and a point in which the maintainability thereof is excellent, as compared with other types of injection molding machines. In this instance, as another type of injection molding machine, for example, a preplasticating type injection molding machine is known.

As shown in FIG. 2, the cylinder 26 includes a hopper 36 provided on a rear side, a heater 38 for heating the cylinder 26, and a nozzle 40 provided on a front-side end thereof. Among such elements, the hopper 36 is provided with a supply port for supplying a molding material resin to the cylinder 26. Further, an injection port for injecting the resin into the cylinder 26 is provided on the nozzle 40.

The screw 28 includes a spiral flight part 42 provided to span across the longitudinal (front-rear) direction thereof. The flight part 42, together with an inner wall of the cylinder 26, constitutes a spiral flow path 44. The spiral flow path 44 guides in a frontward direction the resin that is supplied from the hopper 36 into the cylinder 26.

The screw 28 includes a screw head 46 which is on a distal end on the front side, a check seat 48 that is disposed at a certain distance in a rearward direction from the screw head 46, and a check ring (a ring for backflow-prevention) 50 that is capable of moving between the screw head 46 and the check seat 48.

The check ring 50 moves in a frontward direction relative to the screw 28 when the check ring receives a forward pressure from the resin located on a rear side of the check ring 50 itself. Further, upon receiving a rearward pressure from the resin on the front side thereof, the check ring 50 moves in a rearward direction relative to the screw 28.

At a time of metering (to be described later), the resin which is supplied from the hopper 36 to the supply port of the cylinder 26 is fed and compressed in the frontward direction while being melted along the flow path 44 by the forward rotation of the screw 28, and the pressure on a more rearward side than the check ring 50 becomes larger. When this occurs, the check ring 50 moves in the frontward direction, and the flow path 44 is gradually opened accompanying such movement. Consequently, the resin becomes capable of flowing toward the front side beyond the check seat 48 along the flow path 44.

Conversely, at a time of injection, the pressure on the front side becomes greater than the pressure on the rear side of the check ring 50. When this occurs, the check ring 50 moves in the rearward direction relative to the screw 28, and the flow path 44 is gradually closed accompanying such movement. When the check ring 50 is moved rearward until being seated on the check seat 48, a state is brought about in which it is maximally difficult for the resin to flow forward and rearward of the check ring 50, and a situation is prevented in which the resin on a more frontward side than the check seat 48 flows in reverse to a more rearward side than the check seat 48.

The pressure sensor 30, such as a load cell or the like for sequentially detecting the pressure imposed on the resin inside the cylinder 26, is attached to the screw 28. According to the present embodiment, the above-described "pressure imposed on the resin inside the cylinder 26" may also be referred to simply as a "back pressure" or alternatively a "pressure of a resin (resin pressure)".

The first drive device 32 serves to rotate the screw 28 inside the cylinder 26. The first drive device 32 includes a servomotor 52a, a drive pulley 54a, a driven pulley 56, and a belt member 58a. The drive pulley 54a rotates integrally with a rotary shaft of the servomotor 52a. The driven pulley 56 is disposed integrally on the screw 28. The belt member 58a transmits the rotational force of the servomotor 52a from the drive pulley 54a to the driven pulley 56.

When the rotary shaft of the servomotor 52a rotates, the rotational force of the servomotor 52a is transmitted to the screw 28 via the drive pulley 54a, the belt member 58a, and the driven pulley 56. Consequently, the screw 28 rotates.

In this manner, by causing the rotary shaft of the servomotor 52a to rotate, the first drive device 32 serves to rotate the screw 28. Moreover, by changing the direction in which the rotary shaft of the servomotor 52a is rotated, in response to the changing, the direction of rotation of the screw 28 can be switched between forward rotation and reverse rotation.

A position/speed sensor 60a is provided on the servomotor 52a. The position/speed sensor 60a detects the rotational position and the rotational speed of the rotary shaft of the servomotor 52a. The detection result therefrom is output to the control device 20. Consequently, the control device 20 is capable of calculating the rotation amount, the rotational acceleration, and the rotational speed of the screw 28, based on the rotational position and the rotational speed detected by the position/speed sensor 60a.

The second drive device 34 serves to move the screw 28 forward and rearward (which may be also referred to as "backward" in this specification) inside the cylinder 26. The second drive device 34 includes a servomotor 52b, a drive pulley 54b, a belt member 58b, a ball screw 61, a driven pulley 62, and a nut 63. The drive pulley 54b rotates integrally with a rotary shaft of the servomotor 52b. The belt member 58b transmits the rotational force of the servomotor 52b from the drive pulley 54b to the driven pulley 62. An axial line of the ball screw 61 and an axial line of the screw 28 coincide with each other on the imaginary line L. The nut 63 is screw-engaged with the ball screw 61.

When a rotational force is transmitted from the belt member 58b, the ball screw 61 converts the rotational force into linear motion, and transmits the linear motion to the screw 28. Consequently, the screw 28 is moved forward and rearward.

In this manner, by causing the rotary shaft of the servomotor 52b to rotate, the second drive device 34 serves to move the screw 28 forward and rearward. Moreover, by changing the direction in which the rotary shaft of the servomotor 52b is rotated, in response to the changing, the movement direction of the screw 28 can be switched between forward movement (advancing) and rearward movement (retracting).

Further, a position/speed sensor 60b which is similar to the position/speed sensor 60a is provided on the servomotor 52b. As the position/speed sensor 60b, there may be used the same type of sensor as the position/speed sensor 60a described above, however the present invention is not limited to this feature. Consequently, the control device 20 is capable of calculating the forward and rearward positions of the screw 28 in the front-rear direction, as well as the forward and rearward movement speeds of the screw 28, based on the rotational position and rotational speed detected by the position/speed sensor 60b.

In the above-described injection unit 16, when the screw 28 is forwardly rotated while introducing the resin into the cylinder 26 through the hopper 36, the resin is gradually fed and compressed in the frontward direction along the flow path 44.

During such a time, the resin is melted (plasticized) by being subjected to heating by the heater 38 and due to the rotational force of the screw 28. The molten resin accumulates in a region on the front side of the check seat 48 within the region inside the cylinder 26. Hereinafter, the region on the front side of the check seat 48 inside the cylinder 26 may also be referred to as a "metering region".

The forward rotation of the screw 28 is initiated from a state in which the screw 28 has been fully advanced inside the cylinder 26 (a state in which the volume of the metering region is at a minimum), and is performed until the screw 28 has been moved rearward to a predetermined position (metering position). Further, the rearward movement of the screw 28 is performed so as to maintain the back pressure in the vicinity of a predetermined value (metering pressure) P1. This series of steps may also be referred to as "metering (metering step)".

By determining the position of the screw 28 at the metering position by moving the screw 28 rearward while controlling the forward and rearward movement of the screw 28 so as to maintain the back pressure during metering in the vicinity of the metering pressure P1, it is possible to keep the volume of the metering region and the density of the resin substantially constant each time that the metering is performed.

However, inertia is generated in the servomotor 52a that causes the screw 28 to rotate, and the drive pulley 54a, the belt member 58a, and the driven pulley 56, which transmit the rotational force of the servomotor 52a. Accordingly, even if the rotation of the screw 28 is stopped, the screw 28 cannot be stopped instantaneously. For this reason, a time lag occurs during a period from when the screw 28 has reached the metering position and until the forward rotation of the screw 28 comes to a stop. During such a time lag as well, the resin is continuously fed and compressed from the rearward direction toward the frontward direction. Furthermore, after the forward rotation of the screw 28 is stopped as well, due to the influence of viscous resistance of the molten resin, the flow of the resin from the rearward direction toward the frontward direction is not stopped instantaneously, and the resin continues to be fed and compressed for a while.

Due to the above factors, in most cases, the amount of resin accumulated in the metering region is actually greater than an amount (appropriate amount) of the resin required for satisfactory molding. This causes a molding failure in which the masses of the manufactured molded products vary. However, as will be described later, in accordance with the control device 20 of the present embodiment, even if a larger amount of resin than the appropriate amount is accumulated in the metering region, it is possible to easily achieve uniformity in the masses of the molded products.

After the screw 28 has reached the metering position, the screw 28 is reversely rotated or the screw 28 is moved rearward (sucked back) in order to reduce the back pressure. This series of steps may also be referred to as "pressure reduction (pressure reducing step)". It is desirable that such a reduction in pressure be continued until the back pressure is reduced in close proximity to zero (target pressure P0).

However, if the reduction in pressure is excessive, air is drawn in from the nozzle 40 into the interior of the cylinder 26, and air bubbles become mixed in the resin inside the cylinder 26. An excessive reduction in pressure in this case signifies, for example, that the amount of reduction in pressure (rotation amount, rearward movement position) due to reverse rotation or being sucked back is excessive, or the vigorousness of the reduction in pressure (rotational speed, rearward movement speed) is excessive. When the injection described below is performed using a resin with air bubbles mixed therein, a variation occurs in the masses of the molded products obtained by injection. This becomes a primary cause of poor appearance and poor product quality.

Conversely, if the reduction in pressure is insufficient, a molding failure referred to as drooling (leakage) occurs, in which molten resin leaks from the tip end of the nozzle 40. Accordingly, ideally, the reduction in pressure is executed so as to prevent drooling, while also preventing air bubbles from becoming mixed into the resin that is accumulated inside the cylinder 26. Moreover, according to the control device 20 of the present embodiment, as will be described later, such an ideal reduction in pressure can be easily achieved.

After the metering step and the subsequent pressure reducing step, the resin accumulated in the metering region inside the cylinder 26 is filled into a cavity inside the mold 12. Such a step is also referred to as "injection (injection step)". In the injection step, the screw 28 is advanced on the side of the injection unit 16, while a mold clamping force is applied to the closed mold 12 on the side of the mold clamping unit 14. At this time, the mold 12 and the nozzle 40 are pressed into contact (placed in a nozzle touching) state. As a result, the molten resin is injected from the tip end of the nozzle 40 toward the cavity inside the mold 12. After having carried out the injection step, the mold clamping unit 14 performs a step referred to as "mold opening (mold opening step)" to open the mold 12. Consequently, the resin that is filled in the cavity inside the mold 12 is taken out from the mold 12 as a molded product. Following the mold opening step, a step referred to as "mold closing (mold closing step)" is performed in which the mold 12 included in the mold clamping unit 14 is closed in preparation for a subsequent molding.

The combination of the plurality of steps executed by the injection molding machine 10 in order to produce the molded product may also be referred to as a "molding cycle". Any of the aforementioned metering step, the pressure reducing step, the injection step, the mold opening step, and the mold closing step is a step that can be included in the molding cycle. By repeatedly executing the molding cycle, the injection molding machine 10 is capable of mass producing molded products.

The control device 20 serves to execute at least the pressure reducing step from among the plurality of steps included in the molding cycle. A description will be given below concerning the configuration of the control device 20 of the present embodiment.

Figure 3:
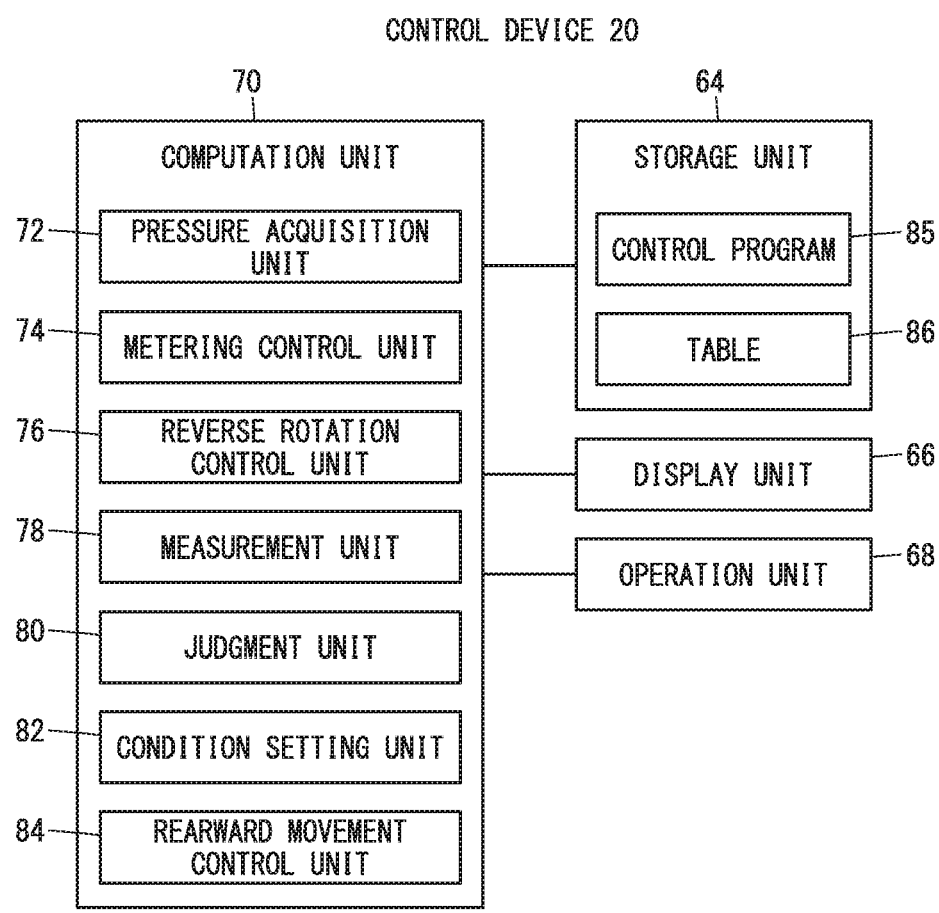
FIG. 3 is a schematic configuration diagram of a control device.

FIG. 3 is a schematic configuration diagram of the control device 20.

As illustrated in FIG. 3, the control device 20 is equipped with a storage unit 64, a display unit 66, an operation unit 68, and a computation unit 70 as a hardware configuration. The computation unit 70 may be configured by a processor such as a CPU (Central Processing Unit) or the like, however the present invention is not limited to this feature. The storage unit 64 includes a volatile memory and a nonvolatile memory, neither of which are shown. Examples of the volatile memory include a RAM or the like. Examples of the nonvolatile memory include a ROM, a flash memory, or the like.

A predetermined control program 85 for controlling the injection unit 16 is stored in advance in the storage unit 64, and apart therefrom, information is stored in the storage unit 64 as needed during execution of the control program 85.

The display unit 66, although not particularly limited, is a display device including, for example, a liquid crystal screen, and appropriately displays information in relation to the control process performed by the control device 20.

The operation unit 68, although not particularly limited, includes, for example, a keyboard, a mouse, or a touch panel that is attached to the screen of the display unit 66, and is used by an operator in order to transmit commands to the control device 20.

As illustrated in FIG. 3, the computation unit 70 includes a pressure acquisition unit 72, a metering control unit 74, a reverse rotation control unit 76, a measurement unit 78, a judgment unit 80, a condition setting unit 82, and a rearward movement control unit 84. These respective units are realized by the computation unit 70 executing the aforementioned control program 85 in cooperation with the storage unit 64.

The pressure acquisition unit 72 sequentially acquires the back pressure detected by the pressure sensor 30. The acquired back pressure is stored in the storage unit 64. At this time, the acquired back pressure is stored in the storage unit 64, for example, in the form of time series data.

The metering control unit 74 performs the aforementioned metering based on predetermined metering conditions (hereinafter, also simply referred to as "metering conditions"). A forward rotational speed (metering rotational speed) of the screw 28 during metering, and the metering pressure P1 are defined as such metering conditions. The metering control unit 74 may refer to the metering conditions that are stored in advance in the storage unit 64, or may follow along with metering conditions that are instructed (specified) by the operator via the operation unit 68.

Further, the metering control unit 74 controls the first drive device 32 and causes the screw 28 to be forwardly rotated at the metering rotational speed until the screw 28 arrives at the metering position, and in addition, controls the second drive device 34 in a manner so that the back pressure becomes the metering pressure P1, and thereby adjusts the rearward movement speed and the position of the screw 28. During this period, the metering control unit 74 performs the control while appropriately referring to the back pressure acquired by the pressure acquisition unit 72.

In addition, when the screw 28 is moved rearward to the metering position, the metering control unit 74 stops the forward rotation and the retraction (rearward movement) of the screw 28. Further, the metering control unit 74 invokes operation of the reverse rotation control unit 76.

After the forward rotation of the screw 28 is stopped, the reverse rotation control unit 76 reversely rotates the screw 28, on the basis of a predetermined reverse rotation condition (hereinafter, also simply referred to as a "reverse rotation condition"). Concerning the reverse rotation of the screw 28, the reverse rotation condition specifies at least one of an angle of rotation (rotation amount), a rotational acceleration, a rotational speed, and a rotation time of the screw 28. The reverse rotation control unit 76 may refer to the reverse rotation condition that is stored in advance in the storage unit 64, or may follow along with a reverse rotation condition that is instructed (specified) by the operator via the operation unit 68.

When the screw 28 is rotated in reverse, the resin on a more rearward side than the check seat 48 is scraped out along the spiral flow path 44 from the check seat 48 toward the side of the hopper 36 in an opposite direction to that at the time of metering. Consequently, the density of the resin on a more rearward side than the check seat 48 decreases, and as a result, the back pressure decreases.

Further, at a point in time when the reverse rotation of the screw 28 is initiated, the check ring 50 is positioned on the side of the screw head 46, and the flow path 44 is open. Accordingly, by the screw 28 continuing to be rotated in reverse, the resin that is accumulated in the metering region passes through the check ring 50, and moves in a rearward direction (flows in reverse) from the frontward direction. More specifically, immediately after metering is completed and the forward rotation of the screw 28 is stopped, due to the influence of viscous resistance of the molten resin, the movement of the resin from the rearward direction toward the frontward direction of the check seat 48 continues for a while. However, after the reverse rotation of the screw 28 is started, accompanying a decrease in the back pressure due to the reverse rotation, it becomes difficult for the resin to move in the frontward direction. Additionally, as the screw 28 continues to reversely rotate, the direction of flow of the resin is reversed, and a reverse flow of the resin from the frontward direction toward the rearward direction of the check seat 48 is initiated.

When the resin flows in reverse from the front to the rear of the check seat 48, since the density of the resin on the front side of the check seat 48 decreases, as a result, the back pressure decreases. Further, since the amount of resin in the metering region decreases, the amount of resin in the metering region, which has adversely become greater than the appropriate amount, can be made to approach the appropriate amount.

In this manner, by causing the resin to flow in reverse, the reverse rotation control unit 76 not only reduces the back pressure, but also can achieve an adjustment in the amount of resin that is accumulated in the metering region.

The measurement unit 78 basically measures an elapsed time from a starting point which is a time point when the screw 28 has been moved rearward to the metering position. However, such an operation differs depending on whether or not information, which according to the present invention is referred to as a "rearward movement initiation time Ts," has been set. The kind of information that makes up the rearward movement initiation time Ts will be described later below.

The judgment as to whether or not the rearward movement initiation time Ts has been set is performed by the judgment unit 80. The judgment unit 80 refers to the storage unit 64, and if the rearward movement initiation time Ts is stored in the storage unit 64, judges that the rearward movement initiation time Ts has been set. If the rearward movement initiation time Ts is not stored in the storage unit 64, the judgment unit 80 judges that the rearward movement initiation time Ts has not been set.

Concerning the operation of the measurement unit 78, which differs depending on whether or not the rearward movement initiation time Ts has been set, at first, a description will be given of a case in which the rearward movement initiation time Ts is not set. In the case that the rearward movement initiation time Ts is not set, the measurement unit 78 performs an operation necessary in order to set the rearward movement initiation time Ts.

More specifically, the measurement unit 78 measures the required time period from when the screw 28 has reached the metering position and until the back pressure reaches the predetermined rearward movement initiation pressure P2. At this time, the measurement unit 78 measures a time period while sequentially referring to (monitoring) the back pressure acquired by the pressure acquisition unit 72.

The rearward movement initiation pressure P2 is determined in advance, prior to the screw 28 being reversely rotated by the reverse rotation control unit 76, so as to lie within a range of being less than or equal to the metering pressure P1 and more than the target pressure P0 (P1≥P2>P0). In this instance, an ideal rearward movement initiation pressure P2 is the magnitude of the back pressure at the time that the amount of resin in the metering region coincides with an appropriate amount due to the reverse flow of the resin that is generated when the screw 28 is rotated in reverse.

The specific value of the ideal rearward movement initiation pressure P2 varies depending on the reverse rotation condition, and does not necessarily coincide with the metering pressure P1. According to the present embodiment, the ideal rearward movement initiation pressure P2 is easily determined, based on a table 86 in which the reverse rotation condition and the ideal rearward movement initiation pressure P2 under the reverse rotation condition are associated with each other.

FIG. 4 is an example of the table 86 that is referred to by the measurement unit 78.

The table 86, for example, is created in advance by experiment. When the table 86 is created, it is preferable to create a plurality of such tables 86 in accordance with specifications of the injection unit 16 and the type of resin. The created table 86 is stored in the storage unit 64.

In the table 86, combinations for each of set values of the reverse rotation speed and the reverse rotation angle of the screw 28 are stored in a "reverse rotation condition" column, and values of the rearward movement initiation pressure P2 corresponding respectively to such combinations are stored in a "rearward movement initiation pressure" column.

Based on the table 86, for example, at a time when the reverse rotation speed specified under the reverse rotation condition is 49 $min^{-1}$, and the reverse rotation angle specified thereunder is 179 degrees, the rearward movement initiation pressure P2 is given by 0.1 MPa. Further, if the reverse rotation speed specified under the reverse rotation condition is 200 $min^{-1}$, then regardless of the reverse rotation angle, the rearward movement initiation pressure P2 is given by 1.0 MPa.

In the foregoing manner, based on the table 86 which is created in advance, trial and error attempts by the operator in order to determine the ideal rearward movement initiation pressure P2 are rendered unnecessary. Although it goes without saying, the table 86 is not limited to the example shown in FIG. 4, as long as the reverse rotation condition and the rearward movement initiation pressure P2 are associated with each other.

During reverse rotation of the screw 28, when the back pressure becomes less than or equal to the rearward movement initiation pressure P2, the measurement unit 78 causes the storage unit 64 to store the required time period that was measured. The measurement unit 78 also invokes operation of the condition setting unit 82. The above are the operations of the measurement unit 78 in the case that the rearward movement initiation time Ts is not set.

As noted previously, operation of the condition setting unit 82 is invoked by the measurement unit 78, in the case that the rearward movement initiation time Ts is not set, and when the back pressure has reached the rearward movement initiation pressure P2.

By referring to the storage unit 64, the condition setting unit 82 acquires the required time period that was measured by the measurement unit 78. Further, the condition setting unit 82 calculates the rearward movement initiation time Ts on the basis of the required time period that was acquired, and stores the calculated rearward movement initiation time Ts in the storage unit 64. Consequently, the rearward movement initiation time Ts is set. Moreover, when the condition setting unit 82 obtains the rearward movement initiation time Ts, the required time period that was acquired may be compensated, and may be set as the rearward movement initiation time Ts, or the required time period that was acquired may be set, without being compensated, as the rearward movement initiation time Ts.

When the rearward movement initiation time Ts is set, the condition setting unit 82 invokes operation of the rearward movement control unit 84. A description will be given later concerning the rearward movement control unit 84, and next, a description will be given of operations of the measurement unit 78 in the case that the rearward movement initiation time Ts has been set. In the case that the rearward movement initiation time Ts has been set, the measurement unit 78 performs a necessary operation in order to invoke operation of the rearward movement control unit 84 on the basis of the rearward movement initiation time Ts.

More specifically, the measurement unit 78 measures an elapsed time from a time point at which the screw 28 has reached the metering position. Unlike the case in which the rearward movement initiation time Ts is not set, during this period, the measurement unit 78 does not have to refer to the back pressure.

When the elapsed time period that is being measured reaches the rearward movement initiation time Ts, the measurement unit 78 invokes operation of the rearward movement control unit 84. The operations of the measurement unit 78 in the case that the rearward movement initiation time Ts has been set are as described above.

As noted above, according to the present embodiment, operation of the rearward movement control unit 84 is invoked by the measurement unit 78 or the condition setting unit 82. The rearward movement control unit 84 causes the screw 28 to be sucked back based on a predetermined rearward movement condition (hereinafter, also simply referred to as a "rearward movement condition").

As can be understood from the above, the rearward movement initiation time Ts is information determined in advance prior to the initiation of suck back, and is information by which the start timing of sucking back the screw 28 is determined.

By causing the screw 28 to be sucked back, the position of the check seat 48 is moved rearward relative to the cylinder 26, and therefore, the volume of the metering region is increased. Consequently, since the forward pressure imposed on the resin in the metering region is alleviated, the back pressure is reduced.

The rearward movement condition specifies at least one of a rearward movement distance, a rearward movement speed, and a rearward movement time of the screw 28, in relation to sucking back of the screw 28. The rearward movement control unit 84 may refer to the rearward movement condition that is stored in advance in the storage unit 64, or may follow along with a rearward movement condition that is specified by the operator via the operation unit 68.

The rearward movement control unit 84 initiates sucking back in an overlapping manner with the reverse rotation of the screw 28 by the reverse rotation control unit 76. By performing reverse rotation and sucking back of the screw 28 in an overlapping manner, the back pressure decreases more rapidly, in comparison with a case in which only one of the reverse rotation and sucking back of the screw 28 is performed, and in the case that the reverse rotation and sucking back of the screw 28 are each performed sequentially.

Further, by using reverse rotation and sucking back of the screw 28 in combination, the reverse rotation condition can be specified in a manner so that the act of sucking back primarily plays a role in causing the back pressure to decrease, whereas the reverse rotation primarily plays a role in causing the amount of resin that is excessively accumulated in the metering region to be reduced. More specifically, by performing sucking back in an overlapping manner during reverse rotation of the screw 28, not only the back pressure can be quickly reduced, but also a situation can be prevented in which the amount of resin in the metering region becomes excessive. Therefore, according to the present embodiment, it is possible to prevent the amount of resin injected into the mold 12 from becoming excessive, and variations in the mass of the manufactured molded products can be reduced. As a result, molding defects such as sink marks and burrs caused by the inappropriate amount of resin can be reduced, and high quality molded products can be stably molded.

Further, the start timing of sucking back the screw 28 occurs when the duration of the reverse rotation of the screw 28 has become greater than or equal to the rearward movement initiation time Ts. By determining the start timing of sucking back in such a manner, in the case that the molding cycle is repeatedly executed, a time span from the start of reverse rotation of the screw 28 after metering and until sucking back of the screw 28 is initiated can be made uniform in each of the molding cycles. Accordingly, in the case that the molding cycle is repeated, the required time period needed to reduce the pressure in each of the molding cycles becomes stable. In the foregoing manner, in accordance with the above-described control device 20, it is possible to easily realize the achievement of a rapid reduction in pressure, and to stabilize the required time period needed for such a reduction in pressure.

Further, if the type of resin, the metering conditions, and the reverse rotation condition are unchanged, at a time that is greater than or equal to the rearward movement initiation time Ts, the back pressure and the amount of resin in the metering region become substantially the same (in close proximity) in each of the molding cycles. Therefore, according to the control device 20 of the present embodiment, it is possible to suppress variations in the mass of the plurality of molded products manufactured in a plurality of molding cycles performed by the injection molding machine 10.

In particular, according to the present embodiment, by referring to the table 86 that has been prepared in advance, an ideal rearward movement initiation pressure P2 is determined without the operator being made to perform trial and error attempts. Consequently, based on the ideal rearward movement initiation pressure P2, an ideal rearward movement initiation time Ts can be easily obtained. Assuming that the rearward movement initiation time Ts is ideal, when the duration of the reverse rotation of the screw 28 becomes greater than or equal to the rearward movement initiation time Ts, the amount of resin in the metering region is placed in a state of being close to the appropriate amount. Therefore, according to the control device 20 of the present embodiment, molded products of good quality can be easily manufactured.

Next, a description will be given concerning the method of controlling the injection molding machine 10 which is performed by the control device 20. As a premise, it is assumed that the metering conditions, the reverse rotation condition, and the rearward movement condition have been stored in the storage unit 64 in advance.

Figure 5:
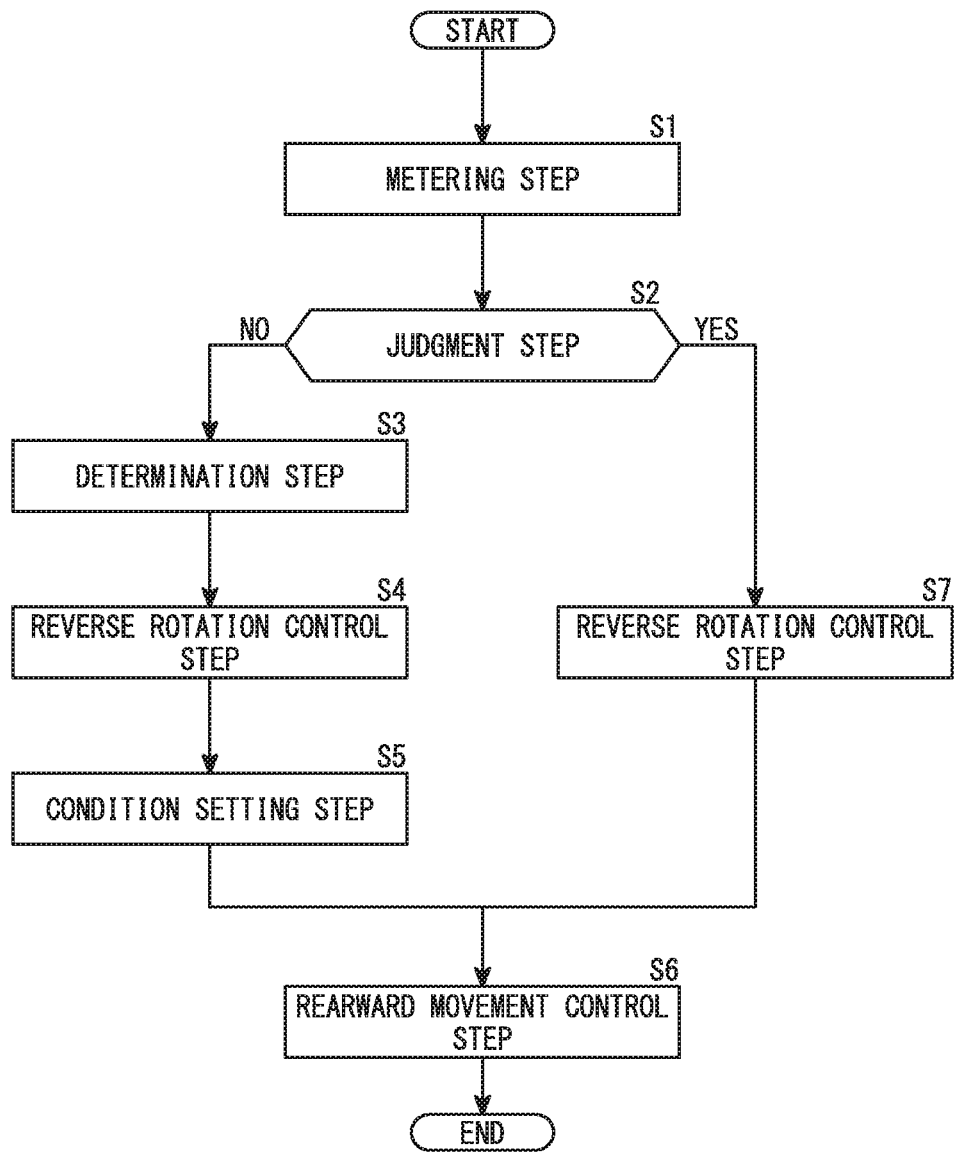
FIG. 5 is a flowchart showing an example of a method of controlling the injection molding machine, which is executed by a control device of the embodiment.

FIG. 5 is a flowchart showing an example of the method of controlling the injection molding machine 10, which is executed by the control device 20 of the embodiment.

First, the control device 20, on the basis of the metering conditions, performs metering of the resin inside the cylinder 26 by controlling the forward rotation and the rearward movement of the screw 28 until the screw 28 is moved rearward to the metering position (step S1: metering step). The metering step continues until the screw 28 reaches the metering position.

Figure 6:
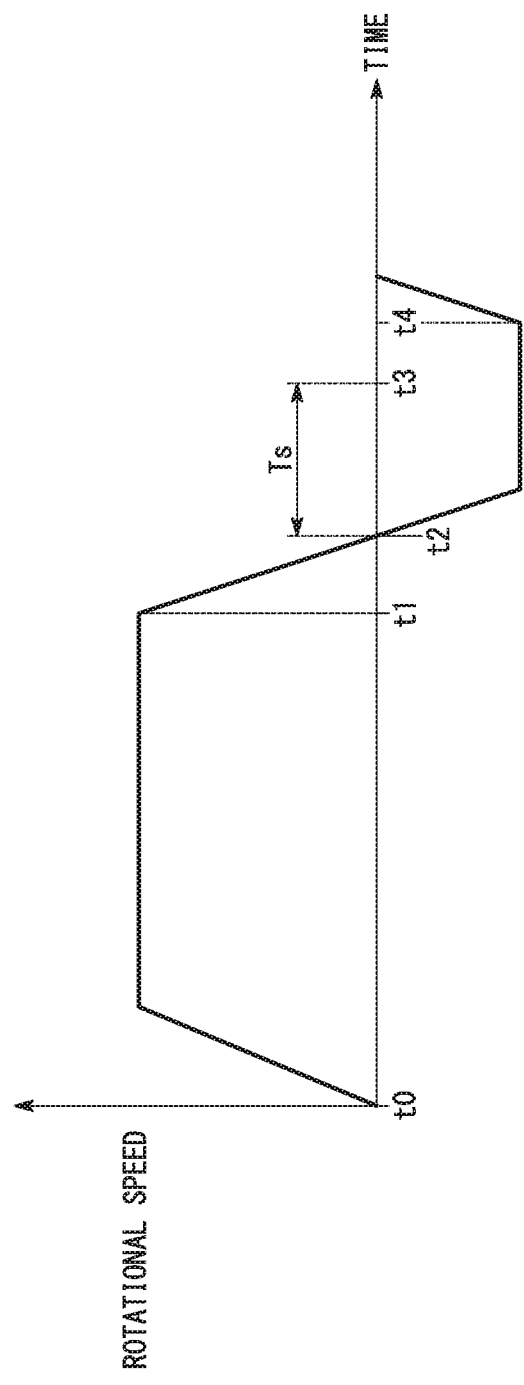
FIG. 6 is a time chart (in which a rearward movement initiation time is not set) concerning a rotational speed of the screw, in the case that the control method of FIG. 5 is performed.
Figure 7:
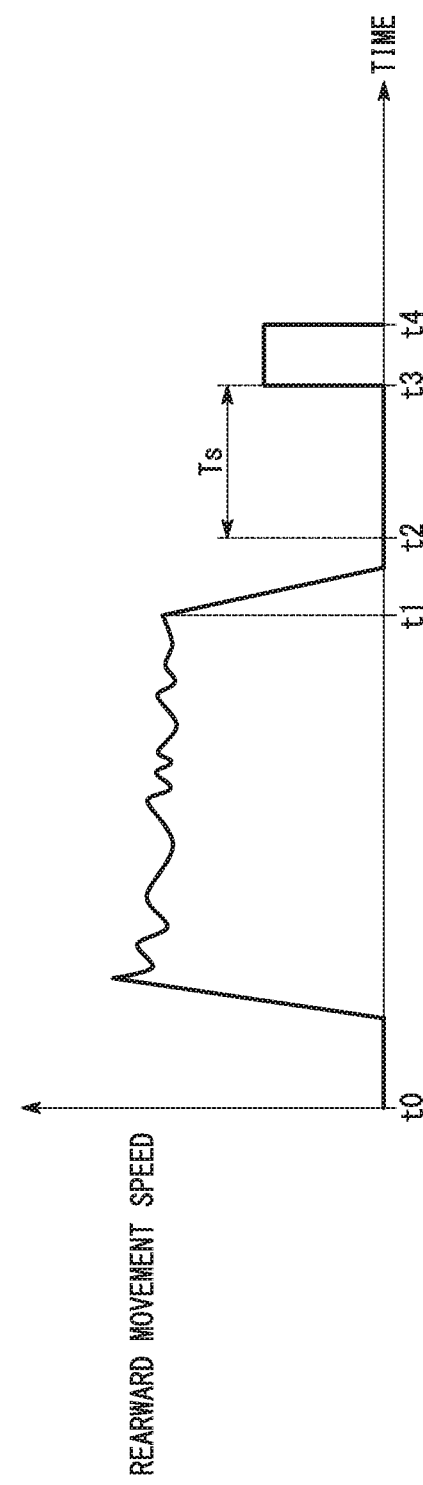
FIG. 7 is a time chart (in which a rearward movement initiation time is not set) concerning a rearward movement speed of the screw, in the case that the control method of FIG. 5 is performed.
Figure 8:
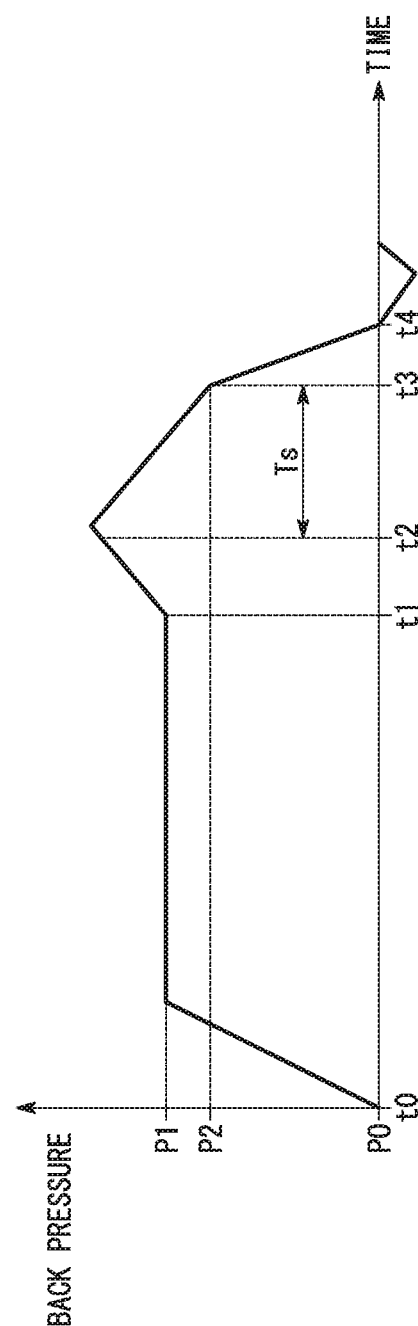
FIG. 8 is a time chart (in which a rearward movement initiation time is not set) concerning a back pressure applied to a resin inside the cylinder, in the case that the control method of FIG. 5 is performed.

FIGS. 6 to 8 are time charts (in which the rearward movement initiation time Ts is not set) concerning the rotational speed (of the screw 28), the rearward movement speed (of the screw 28), and the back pressure, in the case that the control method of FIG. 5 is performed. In each of FIGS. 6 to 8, the vertical axes thereof respectively represent the rotational speed, the rearward movement speed, and the back pressure. Further, the horizontal axis in each of the figures represents time.

Time t0 in FIGS. 6 to 8 indicates a point in time when the metering step is started. Further, time t1 indicates a point in time at which the screw 28 arrives at the metering position.

The period from t0 to t1 is a time zone in which metering is carried out by the control device 20. As shown in FIG. 6, the rotational speed of the screw 28 is adjusted so as to start increasing from the start time t0 of the metering step, thereafter, reach a predetermined metering rotational speed designated by the metering conditions, and thereafter, maintain such a speed until t1. Further, as shown in FIG. 8, the back pressure starts increasing after t0 accompanying the forward rotation of the screw 28, and thereafter, reaches the predetermined metering pressure P1 designated by the metering conditions. As shown in FIG. 7, the rearward movement speed of the screw 28 is controlled so as to start increasing when the back pressure comes in close proximity to the metering pressure P1 after the metering step has started, and thereafter the back pressure becomes the metering pressure P1.

Time t1 and thereafter is a time zone in which the control device 20 carries out a reduction in pressure. Upon reaching time t1, the control device 20 judges whether or not the rearward movement initiation time Ts has been set (step S2: judgment step). As has already been described above, the judgment made at this time is performed by the judgment unit 80. If the result of such a judgment is "not set" (NO), the control device 20 executes a determination step (step S3), whereas if the result is "setting completed" (YES), the control device 20 executes the reverse rotation control step (step S7).

Hereinafter, a case will be described in which the rearward movement initiation time Ts is not set. In this case, the determination step is executed in the same manner as described above. In the determination step, the measurement unit 78 determines the rearward movement initiation pressure P2. The rearward movement initiation pressure P2 that was determined is stored in the storage unit 64.

Subsequently, the control device 20 reversely rotates the screw 28 based on the reverse rotation condition (step S4: reverse rotation control step). In the reverse rotation control step, the screw 28 is rotated in reverse while acquisition of the back pressure is carried out by the pressure acquisition unit 72 and while measurement of the required time needed for the back pressure to reach the rearward movement initiation pressure P2 from a time point when the screw 28 has reached the metering position is carried out by the measurement unit 78.

Time t2 in FIGS. 6 to 8 indicates a point in time when the reverse rotation of the screw 28 is started. Moreover, in order to facilitate description, stopping of the forward rotation of the screw 28 takes place at the same time as time t2.

As can be understood from FIGS. 6 and 7, the rotational speed and the rearward movement speed of the screw 28 are rapidly decreased to zero after time t1. During this period, as shown in FIG. 8, the back pressure continues to increase until reaching time t2. Such a feature takes place because, as already explained previously, the resin is continuously fed and compressed. As a result, an amount of resin in excess of an appropriate amount becomes accumulated in a location on the front side (metering region) of the check seat 48.

The back pressure begins to decrease after time t2 when the reverse rotation of the screw 28 is started. When the screw 28 is rotated in reverse, a reverse flow of the resin gradually occurs inside the cylinder 26, and after such a reverse flow has occurred, the amount of resin in the metering region decreases.

When the back pressure reaches the rearward movement initiation pressure P2, the control device 20 causes the rearward movement initiation time Ts to be set by the condition setting unit 82 on the basis of the required time period that was measured (step S5: condition setting step).

In FIGS. 6 to 8, time t3 indicates a point in time at which the back pressure has reached the rearward movement initiation pressure P2. The rearward movement initiation time Ts in the present example is a time from when the reverse rotation of the screw 28 is started and until the back pressure becomes less than or equal to the rearward movement initiation pressure P2 (Ts=t3−t2).

Next, the control device 20 carries out sucking back of the screw 28 based on the predetermined rearward movement condition (step S6: rearward movement control step). Consequently, the volume of the metering region is increased together with the density of the resin being reduced, and therefore, the back pressure decreases.

In FIGS. 6 to 8, time t4 indicates a point in time (a point in time when the reduction in pressure is completed) at which the back pressure reaches the target pressure P0.

During the period from time t3 to time t4, sucking back of the screw 28 is performed in an overlapping manner with the reverse rotation of the screw 28. During the period from time t3 to time t4, due to such sucking back, since the check seat 48 itself is moved rearward relative to the cylinder 26, the reverse flow of the resin from the metering region to a rearward side beyond the check seat 48 due to the reverse rotation of the screw 28 is prevented. Consequently, from time t3 and thereafter, the amount of resin, which was adjusted in the reverse rotation control step S4, is maintained.

However, even if the reverse flow of the resin from the front side to the rear side of the check seat 48 is suppressed, the resin on the rear side of the check seat 48 continues to flow in reverse due to the reverse rotation of the screw 28. Therefore, even in the period from time t3 to time t4, the back pressure continues to decrease due to the reverse rotation of the screw 28.

As a result, in the period from time t3 to time t4, the decrease in back pressure due to sucking back of the screw 28 and the decrease in back pressure due to reverse rotation of the screw 28 take place in parallel, and therefore, the back pressure rapidly decreases toward the target pressure P0. The rearward movement control step comes to an end when the back pressure falls to the target pressure P0 (END).

Next, a case will be described in which the rearward movement initiation time Ts has been set at the point in time of the judgment step.

In the case that the rearward movement initiation time Ts has already been set, while the duration of the reverse rotation of the screw 28 is measured by the measurement unit 78, the control device 20 causes the screw 28 to be rotated in reverse based on the reverse rotation condition (step S7: reverse rotation control step). Unlike the reverse rotation control step S4, in the reverse rotation control step S7, it is unnecessary to monitor the back pressure.

Figure 9:
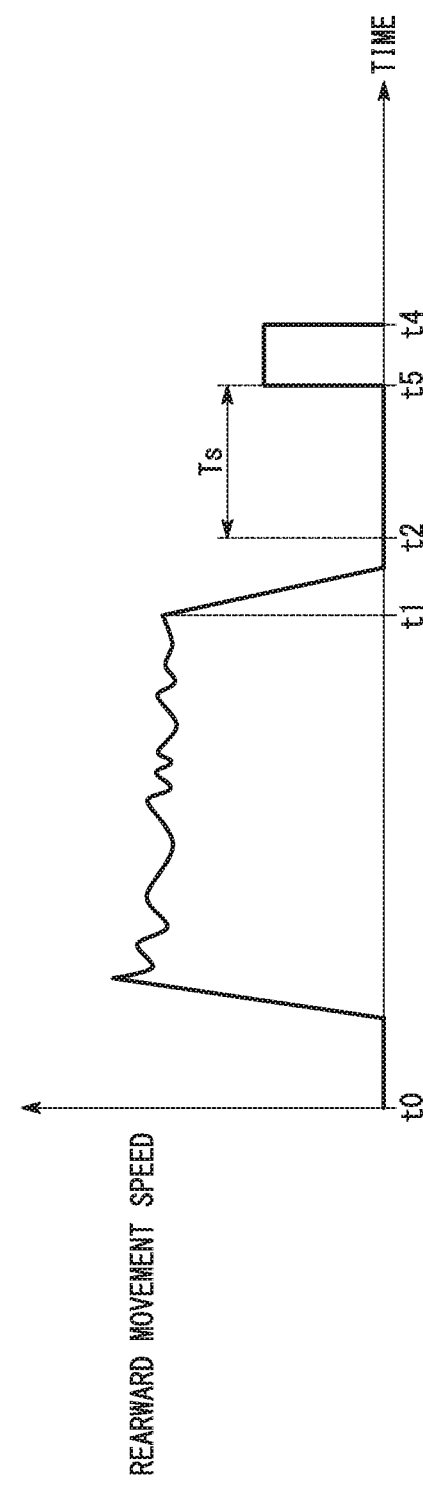
FIG. 9 is a time chart (in which a rearward movement initiation time has been set) concerning the rearward movement speed of the screw, in a molding cycle that differs from that in FIG. 7.

FIG. 9 is a time chart (in which the rearward movement initiation time Ts has been set) concerning the rearward movement speed (of the screw 28), in a molding cycle that differs from that in FIG. 7. In FIG. 9, in the same manner as in FIG. 7, the vertical axis represents the rearward movement speed, and the horizontal axis represents time.

In FIG. 9, time t5 indicates a point in time at which the duration of the reverse rotation of the screw 28 has reached the rearward movement initiation time Ts (which occurs at time t3 in the time series of FIGS. 6 to 8).

When the duration of the reverse rotation of the screw 28 in the reverse rotation control step S7 becomes greater than or equal to the rearward movement initiation time Ts, the control device 20 executes the rearward movement control step (step S6). Consequently, as shown in FIG. 9, the screw 28 is moved rearward at the predetermined rearward movement speed.

Figure 10:
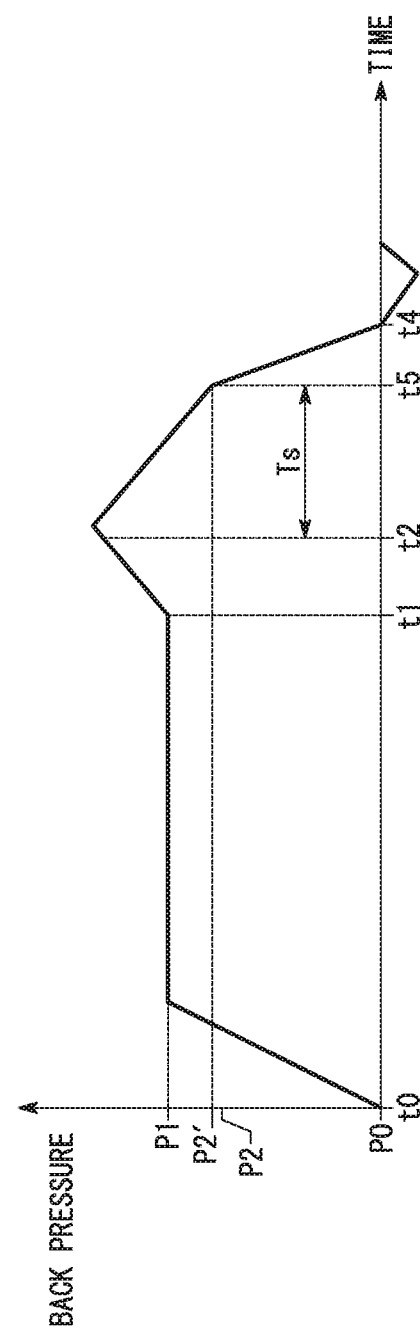
FIG. 10 is a time chart, in the same molding cycle as in FIG. 9, of the back pressure applied to the resin inside the cylinder.

FIG. 10 is a time chart, in the same molding cycle as in FIG. 9, of the back pressure applied to the resin. In FIG. 10, in the same manner as in FIG. 8, the vertical axis represents the back pressure, and the horizontal axis represents time.

In the example of FIG. 10, the back pressure P2' at time t5 is greater than the rearward movement initiation pressure P2 (P2'>P2). The difference between P2 and P2' occurs because the resin is unstable in a fluidic state. Moreover, without being limited to the example of FIG. 10, there may be cases in which, at time t5, the back pressure (P2') coincides with P2, and there may also be cases in which the back pressure (P2') is less than P2.

The control device 20 initiates the rearward movement control step, based not on whether the back pressure for the case in which the rearward movement initiation time Ts has been set is less than or equal to the rearward movement initiation pressure P2, but based on whether or not the duration of the reverse rotation of the screw 28 is greater than or equal to the rearward movement initiation time Ts. Hypothetically, even if the back pressure has become less than or equal to the rearward movement initiation pressure P2 before having reached time t5, the control device 20 does not initiate the rearward movement control step until time t5 is reached.

In the above-described control method, in the case that the rearward movement initiation time Ts has been set, time t5 is equalized as the timing at which sucking back is started. Consequently, the required time period needed to reduce the pressure becomes stable.

Further, in the above-described control method, even in the event that the rearward movement control step is started after the reverse rotation control step S7, sucking back is started in an overlapping manner without waiting for the reverse rotation of the screw 28 to come to an end. Consequently, the reduction in pressure can be achieved more rapidly than in either one of the reverse rotation and sucking back of the screw 28, or in the case that such actions are performed sequentially.

The flow of the control process from the rearward movement control step and thereafter following the reverse rotation control step S7, as shown in FIG. 5, is the same as the case in which the rearward movement initiation time Ts is not set, and therefore, description will be omitted herein (END).

The above description is offered as one example of the control device 20 and the control method according to the present embodiment. However, as will be exemplified below, it should be noted that the control device 20 and the control method of the present embodiment are not limited to the features described above.

In the event that the metering can be performed by another device, the control device 20 need not necessarily comprise the metering control unit 74. In this case, the control device 20 may be started up upon completion of the metering. In this regard, the control device 20 may also include constituent elements in order to control injection and mold opening within the molding cycle.

The device or apparatus to which the control device 20 can be applied is not limited to an in-line injection molding machine (the injection molding machine 10). The control device 20 may be applied to a preplasticating type injection molding machine (a screw preplasticating type injection molding machine) which is equipped with a screw.

The configurations of the first drive device 32 and the second drive device 34 are not limited to the configurations described above. For example, instead of the servomotor 52a and the servomotor 52b, at least one of the first drive device 32 and the second drive device 34 may include a hydraulic cylinder or a hydraulic motor.

[Modifications]

Although an embodiment has been described above as one example of the present invention, it goes without saying that various modifications or improvements are capable of being added to the above-described embodiment. It is clear from the scope of the claims that other modes to which such modifications or improvements have been added can be included within the technical scope of the present invention.

(Modification 1)

The method of determining the rearward movement initiation pressure P2 is not limited to referring to the table 86. In the determination step, the rearward movement initiation pressure P2 may be determined by being specified by the operator via the operation unit 68.

Further, after the rearward movement initiation pressure P2 has been determined by referring to the table 86, by the operator operating the operation unit 68, the value of the rearward movement initiation pressure P2 may be adjusted. In this case as well, it is preferable for the operator to confirm whether or not the product quality of the molded product lies within an allowable range permitted by the product itself.

During operation of the injection molding machine 10, there may be cases in which the operator considers reducing the back pressure more rapidly, by lengthening the time period during which the reverse rotation and sucking back of the screw 28 are performed in an overlapping manner. According to the present modification, it is possible to enable convenience in relation to such an intention of the operator.

(Modification 2)

The measurement unit 78, instead of time, may measure the rotation amount of the screw 28. In such a case, the condition setting unit 82 sets the rearward movement initiation rotation amount, based on the rotation amount (required rotation amount) of the screw 28, from a time point when the screw 28 has reached the metering position and until the resin pressure reaches the rearward movement initiation pressure P2. The condition setting unit 82 may set the required rotation amount that is acquired, as the rearward movement initiation rotation amount, or may compensate the required rotation amount that is acquired and set such a compensated amount as the rearward movement initiation rotation amount.

In the case that the rearward movement initiation rotation amount has been set, the rearward movement control unit 84 may initiate sucking back when the rotation amount has reached the rearward movement initiation rotation amount. In this case as well, it is possible to easily realize the achievement of a rapid reduction in pressure, and to stabilize the required time period needed for such a reduction in pressure.

(Modification 3)

According to the embodiment, the reverse rotation of the screw 28 continues until time t4 when the back pressure has decreased to the target pressure P0, however the reverse rotation of the screw 28 may be stopped between time t3 (or time t5) and time t4. In that case, the reverse rotation condition may be specified in a manner so that the reverse rotation of the screw 28 is stopped between time t3 (or time t5) and time t4.

From time t3 (or time t5) and thereafter, and until the reverse rotation of the screw 28 is stopped, the reverse rotation and sucking back of the screw 28 are performed in an overlapping manner (i.e., in a concurrent manner). Accordingly, the reduction in pressure can be achieved more rapidly than in a case in which the reverse rotation of the screw 28 and sucking back of the screw 28 are performed separately in different time zones.

Further, after the reverse rotation of the screw 28 has been stopped, the reverse flow of the resin in the rearward direction from the metering region is further suppressed in comparison with the embodiment.

(Modification 4)

The condition setting unit 82 may set as the rearward movement initiation time Ts a minimum value, a maximum value, an average value, a median value, or a mode value of a plurality of the required time periods. That is to say, in the condition setting step S5, there may be set as the rearward movement initiation time Ts a minimum value, a maximum value, an average value, a median value, or a mode value of a plurality of the required time periods. The operator may arbitrarily specify which one of the minimum value, the maximum value, the average value, the median value, and the mode value is selected.

In the present modification, unlike the embodiment, measurement of the required time period (the reverse rotation control step S4) is performed a plurality of times. In this case, the control device 20 performs the reverse rotation control step S4 while repeatedly carrying out the molding cycle, for example, up to a predetermined number of cycles and without relying on the judgment step. Further, each time that the required time period is measured, the required time period is stored in the storage unit 64 (storage step). Thereafter, the rearward movement initiation time Ts may be determined based on the plurality of required time periods that have been measured up to that point. In addition, thereafter, instead of the reverse rotation control step S4, the reverse rotation control step S7 may be executed.

Further, the features of Modification 2 may be combined with the present modification. More specifically, instead of the rearward movement initiation time Ts based on the required time period, the control device 20 may obtain the rearward movement initiation rotation amount on the basis of the required rotation amount. In this case, the condition setting unit 82 may set as the rearward movement initiation rotation amount a minimum value, a maximum value, an average value, a median value, or a plurality of the required rotation amounts. That is to say, in the condition setting step S5, there may be set as the rearward movement initiation rotation amount a minimum value, a maximum value, an average value, a median value, or a mode value of the plurality of required rotation amounts.

(Modification 5)

Figure 11:
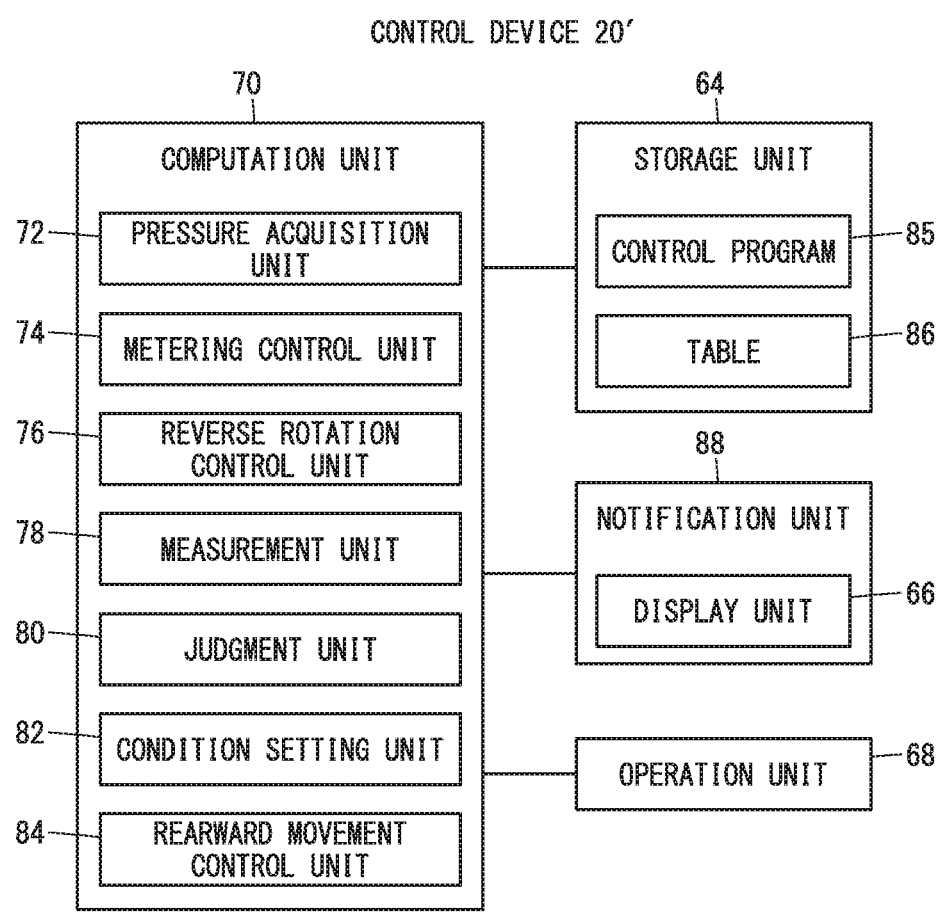
FIG. 11 is a schematic configuration diagram of the control device according to a fifth modification.

FIG. 11 is a schematic configuration diagram of the control device 20' according to a fifth modification. The same elements as those in the embodiment are designated using the same reference numerals.

The control device 20' may further be equipped with a notification unit 88. The notification unit 88 may issue a notification to such an effect in the case that the reverse rotation of the screw 28 has been completed before the rearward movement control unit 84 causes the screw 28 to be moved rearward. Further, the notification unit 88 may issue a notification to such an effect in the case that the back pressure remains more than the rearward movement initiation pressure P2 at a point in time when the rearward movement control unit 84 initiates rearward movement of the screw 28. Alternatively, the notification unit 88 may issue notifications of both of the two above-described effects.

That is to say, the control method may further include a notification step of issuing a notification to such an effect in the case that the reverse rotation of the screw 28 is completed without having executed the rearward movement control step. Further, in the notification step, a notification may be issued to such an effect in the case that the back pressure remains more than the rearward movement initiation pressure P2 at a point in time when the rearward movement of the screw 28 in the rearward movement control step is initiated. Alternatively, in the notification step, notifications may be issued of both of the two above-described effects.

In accordance with this feature, the operator can be prompted to review the reverse rotation condition, and appropriate operation of the injection molding machine 10 thereafter can be promoted.

The notification unit 88, although not particularly limited to such features, includes, for example, a speaker that emits sound, and a lamp (notification lamp) that emits light. Further, as shown in FIG. 11, the notification unit 88 may also include the display unit 66 that was described in the embodiment. The notification format of the notification unit 88 having the display unit 66 may be, for example, a format in which predetermined icons or messages are displayed on the display unit 66.

(Modification 6)

The above-described embodiments and the modifications thereof may be appropriately combined within a range in which no technical inconsistencies occur.

Inventions that can be Obtained from the Embodiment

The inventions that can be grasped from the above-described embodiment and the modifications thereof will be described below.

<First Invention>

The control device (20, 20') for the injection molding machine (10) including the cylinder (26) into which the resin is supplied, and the screw (28) configured to move forward and rearward and rotate inside the cylinder (26), the injection molding machine being configured to perform a metering of the resin while the resin is being melted inside the cylinder (26), by causing the screw (28) to be moved rearward to a predetermined metering position while being forwardly rotated, the control device including the pressure acquisition unit (72) configured to acquire a pressure of the resin, the reverse rotation control unit (76) configured to cause the screw (28) to be rotated in reverse based on the predetermined reverse rotation condition, so as to reduce the pressure of the resin, after the screw (28) has reached the predetermined metering position, the measurement unit (78) configured to measure an elapsed time or a rotation amount of the screw (28) from when the screw (28) has reached the predetermined metering position, and the rearward movement control unit (84) configured to initiate sucking back of the screw (28) on the basis of the predetermined rearward movement condition so as to occur in an overlapping manner with the reverse rotation of the screw, in the case that a predetermined rearward movement initiation time (Ts) has elapsed, or in the case that the screw (28) has been rotated by a predetermined rearward movement initiation rotation amount, from when the screw (28) has reached the predetermined metering position.

In accordance with such features, the control device (20, 20') for the injection molding machine (10) is provided, in which it is easy to quickly achieve a reduction in pressure, and to stabilize the required time period needed for such a reduction in pressure.

There may further be provided the judgment unit (80) configured to judge whether or not the rearward movement initiation time (Ts) or the rearward movement initiation rotation amount has been set, and the condition setting unit (82) configured to, in the case that the rearward movement initiation time (Ts) has not been set, set the rearward movement initiation time (Ts) on the basis of a required time period from when the screw (28) has reached the predetermined metering position and until the pressure of the resin reaches the predetermined rearward movement initiation pressure (P2), or configured to, in the case that the rearward movement initiation rotation amount has not been set, set the rearward movement initiation rotation amount on the basis of the required rotation amount of the screw (28) required from when the screw (28) has reached the predetermined metering position and until the pressure of the resin reaches the rearward movement initiation pressure (P2). In accordance with such features, in the case that the rearward movement initiation rotation amount is not set, the rearward movement initiation rotation amount is set by the condition setting unit (82).

There may further be provided the storage unit (64) configured to store the required time period or the required rotation amount, wherein, in the case that a plurality of the required time periods are stored in the storage unit (64), the condition setting unit (82) may set, as the rearward movement initiation time (Ts), a minimum value, a maximum value, an average value, a median value, or a mode value of the plurality of required time periods, or in the case that a plurality of the required rotation amounts are stored in the storage unit (64), the condition setting unit (82) may set, as the rearward movement initiation rotation amount, a minimum value, a maximum value, an average value, a median value, or a mode value of the plurality of required rotation amounts. In accordance with this feature, the rearward movement initiation time (Ts) or the rearward movement initiation rotation amount can be determined on the basis of the plurality of required time periods or the plurality of required rotation amounts.

There may further be provided the operation unit (68) through which the operator specifies the rearward movement initiation pressure (P2), wherein the condition setting unit (82) may set the rearward movement initiation time (Ts) or the rearward movement initiation rotation amount on the basis of the rearward movement initiation pressure (P2) specified by the operation unit (68). In accordance with this feature, the reverse rotation and sucking back of the screw (28) can be performed in an overlapping manner after the resin pressure has become less than or equal to the specified rearward movement initiation pressure (P2).

There may further be provided the table (86) in which the predetermined reverse rotation condition and the rearward movement initiation pressure (P2) are associated with each other, wherein the condition setting unit (82) may set the rearward movement initiation time (Ts) or the rearward movement initiation rotation amount on the basis of the rearward movement initiation pressure (P2) that is determined on the basis of the predetermined reverse rotation condition and the table (86). In accordance with this feature, an ideal rearward movement initiation pressure (P2) can be determined without the operator being made to perform trial and error attempts.

The predetermined reverse rotation condition may specify at least one of a rotation amount, a rotational acceleration, a rotational speed, and a rotation time of the screw (28). In accordance with this feature, the pressure of the resin (back pressure) can be reduced due to the reverse rotation of the screw (28).

The predetermined rearward movement condition may specify at least one of a rearward movement distance, a rearward movement speed, and a rearward movement time of the screw (28). In accordance with this feature, the pressure of the resin can be reduced due to the rearward movement (retraction) of the screw (28).

There may further be provided the notification unit (88) configured to issue at least one of a notification in the case that the reverse rotation of the screw (28) by the reverse rotation control unit (76) is completed before the rearward movement control unit (84) causes the screw (28) to be moved rearward, and a notification in the case that the pressure of the resin does not lie within a predetermined range at a point in time when the rearward movement control unit (84) initiates rearward movement of the screw (28). In accordance with this feature, it is possible to prompt the operator to perform an appropriate operation of the injection molding machine (10).

<Second Invention>

The method of controlling the injection molding machine (10) including the cylinder (26) into which the resin is supplied, and the screw (28) configured to move forward and rearward and rotate inside the cylinder (26), the injection molding machine being configured to perform a metering of the resin while the resin is being melted inside the cylinder (26), by causing the screw (28) to be moved rearward to the predetermined metering position while being forwardly rotated, the method including the reverse rotation control step of causing the screw (28) to be rotated in reverse based on the predetermined reverse rotation condition, so as to reduce a pressure of the resin, while measuring the pressure of the resin inside the cylinder (26), and an elapsed time or a rotation amount of the screw (28), from when the screw (28) has reached the predetermined metering position, and the rearward movement control step of carrying out sucking back of the screw (28) on the basis of a predetermined rearward movement condition so as to occur in an overlapping manner with the reverse rotation of the screw (28), in the case that the predetermined rearward movement initiation time (Ts) has elapsed, or in the case that the screw (28) has been rotated by a predetermined rearward movement initiation rotation amount, from when the screw (28) has reached the predetermined metering position.

In accordance with such features, the control method for the injection molding machine (10) is provided, in which it is easy to quickly achieve a reduction in pressure, and to stabilize the required time period needed for such a reduction in pressure.

There may further be included the judgment step of judging, prior to the rearward movement control step, whether or not the rearward movement initiation time (Ts) or the rearward movement initiation rotation amount has been set, and a condition setting step of, in the case that the rearward movement initiation time (Ts) has not been set, and after the judgment step and prior to the rearward movement control step, setting the rearward movement initiation time (Ts) on the basis of a required time period from when the screw (28) has reached the predetermined metering position and until the pressure of the resin reaches the predetermined rearward movement initiation pressure (P2), or in the case that the rearward movement initiation rotation amount has not been set, and after the judgment step and prior to the rearward movement control step, setting the rearward movement initiation rotation amount on the basis of a required rotation amount required from when the screw (28) has reached the predetermined metering position and until the pressure of the resin reaches the rearward movement initiation pressure (P2). In accordance with such features, in the case that the rearward movement initiation time (Ts) is not set, the rearward movement initiation time (Ts) is set by the condition setting unit (82). Further, in the case that the rearward movement initiation rotation amount is not set, the rearward movement initiation rotation amount is set by the condition setting unit (82).

There may further be included the storage step of storing the required time period or the required rotation amount, wherein, in the case that a plurality of the required time periods have been stored so far, the condition setting step may set, as the rearward movement initiation time (Ts), a minimum value, a maximum value, an average value, a median value, or a mode value of the plurality of required time periods, or in the case that a plurality of the required rotation amounts have been stored so far, the condition setting step may set, as the rearward movement initiation rotation amount, a minimum value, a maximum value, an average value, a median value, or a mode value of the plurality of required rotation amounts. In accordance with this feature, the rearward movement initiation time (Ts) or the rearward movement initiation rotation amount can be determined on the basis of the plurality of required time periods or the plurality of required rotation amounts.

There may further be included the determination step of determining, prior to the reverse rotation control step, the rearward movement initiation pressure (P2) based on an instruction of an operator, wherein, in the condition setting step, the rearward movement initiation time (Ts) or the rearward movement initiation rotation amount may be set on the basis of the rearward movement initiation pressure (P2) determined in the determination step. In accordance with this feature, the reverse rotation and sucking back of the screw (28) can be performed in an overlapping manner after the resin pressure has become less than or equal to the instructed rearward movement initiation pressure (P2).

There may further be provided the determination step of determining, prior to the reverse rotation control step, the rearward movement initiation pressure (P2) by referring to the table (86) in which the predetermined reverse rotation condition and the rearward movement initiation pressure (P2) are associated with each other, wherein, in the condition setting step, the rearward movement initiation time (Ts) or the rearward movement initiation rotation amount may be set on the basis of the rearward movement initiation pressure (P2) that is determined on the basis of the predetermined reverse rotation condition and the table (86). In accordance with this feature, an ideal rearward movement initiation pressure (P2) can be determined without the operator performing trial and error attempts.

The predetermined reverse rotation condition may specify at least one of a rotation amount, a rotational acceleration, a rotational speed, and a rotation time of the screw (28). In accordance with this feature, the pressure of the resin (back pressure) can be reduced due to the reverse rotation of the screw (28).

The predetermined rearward movement condition may specify at least one of a rearward movement distance, a rearward movement speed, and a rearward movement time of the screw (28). In accordance with this feature, the pressure of the resin can be reduced due to the rearward movement (retraction) of the screw (28).

There may further be included a notification step of issuing at least one of a notification in the case that the reverse rotation of the screw (28) is completed before execution of the rearward movement control step, and a notification in the case that the pressure of the resin does not lie within a predetermined range at a point in time when rearward movement of the screw (28) in the rearward movement control step is initiated. In accordance with this feature, it is possible to prompt the operator to perform an appropriate operation of the injection molding machine (10).

What is claimed is:

1. A control device for an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the control device comprising one or more processor that execute computer-executable instructions stored in a memory, wherein the one or more processors execute the computer-executable instructions to cause the control device to:

acquire a pressure of the resin;

cause, based on a predetermined reverse rotation condition, the screw to be rotated in reverse in a state where the screw stopped moving rearward, so as to reduce the pressure of the resin, after the screw has reached the predetermined metering position;

measure an elapsed time or a rotation amount of the screw from when the screw has reached the predetermined metering position; and initiate sucking back of the screw based on a predetermined rearward movement condition so as to occur in an overlapping manner with the reverse rotation of the screw, in a case that a predetermined rearward movement initiation time has elapsed, or in a case that the screw has been rotated by a predetermined rearward movement initiation rotation amount, from when the screw starts being rotated in reverse in a state where the screw stopped moving rearward.

2. The control device for the injection molding machine according to claim 1, wherein the one or more processors execute the computer-executable instructions to cause the control device to:

judge whether or not the rearward movement initiation time or the rearward movement initiation rotation amount has been set; and set, in a case that the rearward movement initiation time has not been set, the rearward movement initiation time based on a required time period from when the screw has reached the predetermined metering position and until the pressure of the resin reaches a predetermined rearward movement initiation pressure, or configured to, in a case that the rearward movement initiation rotation amount has not been set, set the rearward movement initiation rotation amount based on a required rotation amount of the screw required from when the screw has reached the predetermined metering position and until the pressure of the resin reaches the rearward movement initiation pressure.

3. The control device for the injection molding machine according to claim 2, wherein the memory stores the required time period or the required rotation amount, and the one or more processors execute the computer-executable instructions to cause the control device to set, in a case that a plurality of the required time periods are stored in the memory, as the rearward movement initiation time, a minimum value, a maximum value, an average value, a median value, or a mode value of the plurality of required time periods, or in a case that a plurality of the required rotation amounts are stored in the memory, set, as the rearward movement initiation rotation amount, a minimum value, a maximum value, an average value, a median value, or a mode value of the plurality of required rotation amounts.

4. The control device for the injection molding machine according to claim 2, wherein the one or more processors execute the computer-executable instructions to cause the control device to:

control the rearward movement initiation pressure based on an operator input; and set the rearward movement initiation time or the rearward movement initiation rotation amount based on the rearward movement initiation pressure.

5. The control device for the injection molding machine according to claim 1, wherein the predetermined reverse rotation condition specifies at least one of a rotation amount, a rotational acceleration, a rotational speed, and a rotation time of the screw.

6. The control device for the injection molding machine according to claim 1, wherein the predetermined rearward movement condition specifies at least one of a rearward movement distance, a rearward movement speed, and a rearward movement time of the screw.

7. The control device for the injection molding machine according to claim 1, to issue wherein the one or more processors execute the computer-executable instructions to cause the control device to issue at least one of:

a notification in a case that the reverse rotation of the screw is completed before the screw is moved rearward; and a notification in a case that the pressure of the resin does not lie within a predetermined range at a point in time when rearward movement of the screw is initiated.

8. The control device for the injection molding machine according to claim 1, wherein the one or more processors execute the computer-executable instructions to cause the control device to measure the elapsed time without reference to the pressure of the resin.

9. The control device for the injection molding machine according to claim 1, wherein, in a case that a molding cycle is repeatedly executed, a time span from a start of the reverse rotation of the screw the screw has reached the predetermined metering position until sucking back of the screw is initiated is made uniform.

10. The control device for the injection molding machine according to claim 1, wherein only the elapsed time is considered when the rearward movement initiation time is set.

11. A control device for an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the control device comprising one or more processors that execute computer-executable instructions stored in a memory, wherein the one or more processors execute the computer-executable instructions to cause the control device to:

acquire a pressure of the resin;

cause, based on a predetermined reverse rotation condition, the screw to be rotated in reverse, so as to reduce the pressure of the resin, after the screw has reached the predetermined metering position;

measure an elapsed time or a rotation amount of the screw from when the screw has reached the predetermined metering position;

initiate sucking back of the screw based on a predetermined rearward movement condition so as to occur in an overlapping manner with the reverse rotation of the screw, in a case that a predetermined rearward movement initiation time has elapsed, or in a case that the screw has been rotated by a predetermined rearward movement initiation rotation amount, from when the screw starts being rotated in reverse in a state where the screw stopped moving rearward;

judge whether or not the rearward movement initiation time or the rearward movement initiation rotation amount has been set; and in a case that the rearward movement initiation time has not been set, set the rearward movement initiation time based on a required time period from when the screw has reached the predetermined metering position and until the pressure of the resin reaches a predetermined rearward movement initiation pressure, or, in a case that the rearward movement initiation rotation amount has not been set, set the rearward movement initiation rotation amount based on a required rotation amount of the screw required from when the screw has reached the predetermined metering position and until the pressure of the resin reaches the rearward movement initiation pressure, wherein the memory includes a table in which the predetermined reverse rotation condition and the rearward movement initiation pressure are associated with each other, and wherein the one or more processors execute the computer-executable instructions to cause the control device to set the rearward movement initiation time or the rearward movement initiation rotation amount based on the rearward movement initiation pressure that is determined based on the predetermined reverse rotation condition and the table.

\* \* \* \* \*